(12) United States Patent
Meaney et al.

(10) Patent No.: US 7,159,106 B2
(45) Date of Patent: Jan. 2, 2007

(54) INFORMATION HANDLING SYSTEM MANUFACTURE METHOD AND SYSTEM

(75) Inventors: Roy Meaney, Ballynecty (IE); Philip Brisky, Manchaca, TX (US); Eric Hoxworth, Austin, TX (US); Joseph Tallieu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 483 days.

(21) Appl. No.: 10/406,462

(22) Filed: Apr. 3, 2003

(65) Prior Publication Data

US 2004/0199758 A1 Oct. 7, 2004

(51) Int. Cl.
G06F 9/00 (2006.01)

(52) U.S. Cl. ........................................... 713/2
(58) Field of Classification Search ............... 713/2
See application file for complete search history.

(56) References Cited

U.S. PATENT DOCUMENTS

| | | | |
|---|---|---|---|
| 5,280,627 A * | 1/1994 | Flaherty et al. ............... 713/2 |
| 5,838,907 A * | 11/1998 | Hansen ..................... 709/220 |
| 5,948,101 A * | 9/1999 | David et al. .................. 713/2 |
| 6,029,237 A | 2/2000 | Beelitz ....................... 711/173 |
| 6,286,038 B1 * | 9/2001 | Reichmeyer et al. ....... 709/220 |
| 6,317,826 B1 * | 11/2001 | McCall et al. ................ 713/1 |
| 6,347,371 B1 | 2/2002 | Beelitz et al. ................. 713/2 |
| 6,490,677 B1 | 12/2002 | Aguilar et al. ................. 713/1 |
| 6,601,096 B1 * | 7/2003 | Lassiter, Jr. .................. 709/222 |
| 6,757,723 B1 * | 6/2004 | O'Toole et al. .............. 709/222 |
| 6,804,774 B1 * | 10/2004 | Larvoire et al. ............... 713/2 |
| 6,901,534 B1 * | 5/2005 | Carr ............................ 714/27 |
| 6,988,193 B1 * | 1/2006 | French et al. .................. 713/2 |
| 2003/0005096 A1 * | 1/2003 | Paul et al. ................... 709/222 |
| 2003/0018759 A1 * | 1/2003 | Baumann .................... 709/221 |
| 2003/0208675 A1 * | 11/2003 | Burokas et al. ................ 713/1 |
| 2004/0006688 A1 * | 1/2004 | Pike et al. ...................... 713/1 |

OTHER PUBLICATIONS

Lanwork Technologies Co. 2001. Paul Cowan, What is PXE?.*

* cited by examiner

Primary Examiner—Thomas Lee
Assistant Examiner—Vincent Tran
(74) Attorney, Agent, or Firm—Hamilton & Terrile, LLP; Robert W. Holland

(57) ABSTRACT

A universal PXE client obtains configuration information for an information handling system, applies the configuration information to create a drive on the information handling system and loads a manufacture operating system in the drive. The manufacture operating system runs a manufacture application that configures the software of the information handling system. The universal PXE client is generated by a scripting engine of a network boot program that is downloaded to the information handling system with a NIC boot kernel activated on power-up. The state of manufacture is periodically saved to a network location that tracks manufacture progress and persists manufacture state information through system re-boots.

16 Claims, 2 Drawing Sheets

INFORMATION HANDLING SYSTEM MANUFACTURE METHOD AND SYSTEM

BACKGROUND OF THE INVENTION

1. Field of the Invention

The present invention relates in general to the field of information handling system manufacture, and more particularly to a method and system for network-based configuration of information handling system software.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Purchasers of information handling systems typically prefer to select hardware and software components so that a purchased information handling system is built and configured to the purchaser's specification. One difficulty with building information handling systems to order with a wide variety of hardware and software components is that each unique information handling system generally is built with a unique configuration. Network tools are available to download software components as images or executable files that install on information handling system storage devices, such as a hard disk drive. However, in order for the network tools to communicate with the information handling system, an operating system typically is required to control the hardware components. Thus, during manufacture, a floppy disk is often used to initially power-up the information handling system with a manufacture operating system that includes configuration information for the hardware components, such as the NIC and hard disk drive, to communicate with network tools. The floppy disk provides information to build, test and install software on the information handling system and also provides a persistent storage area that tracks the software configuration process through manufacture of the information handling system, such as through repeated boots and downloading of images to the hard disk drive that destroy the contents of hard disk drives during storage of the image.

A difficulty with using floppy disks to manufacture information handling systems is that the preparation of a floppy disk for each information handling system is expensive and time consuming. As hardware components of an information handling system are assembled, the identification of each component is tracked and used to create the configuration information on the floppy disk for initial power-up during manufacture of the information handling system. Copying of the configuration information to a floppy disk is slow and unreliable, and the storage capacity is limited. Further, floppy disk drives are now often not included with information handling systems. One way to avoid the use of floppy disks during manufacture is to instead use the hard disk drive. However, hard disk drives will not work in all situations, such as when RAID hardware is installed or no FAT partitions exist, and limits the use of imaging techniques since imaging tools destroy the contents stored on the hard disk drive. Another way to avoid the use of floppy disks is to initiate boot from a network, such as with a Pre-boot Execution Environment (PXE) server, however, PXE boots generally requires that basic software configuration be installed to support network communications.

SUMMARY OF THE INVENTION

Therefore a need has arisen for a method and system which supports building, testing and downloading software during manufacture of an information handling system without the use of a floppy disk.

A further need exists for a method and system which tracks configuration of software during manufacture of an information handling system without use of a removable medium.

In accordance with the present invention, a method and system are provided which substantially reduce the disadvantages and problems associated with previous methods and systems for configuring information handling system software during manufacture. The information handling system downloads a universal PXE client at power-up. The universal PXE client obtains configuration information for the information handling system from a network location and applies the configuration information to create a virtual drive on the information handling system which stores a manufacture operating system and manufacture information to configure the software of the information handling system without a removable storage medium.

More specifically, hardware component configuration of a manufactured information handling system is stored at a manufacture data storage and retrieval system network location. Upon initial power-up of the manufactured information handling system, a boot kernel in NIC firmware executes to download a network boot program from a PXE server. The boot kernel executes the network boot program on the information handling system to create a universal PXE client. The universal PXE client looks up the configuration information from the network location by reference to a unique identifier for the information handling system and applies the configuration information to create a virtual drive in RAM of the information handling system. The Universal PXE client then downloads a manufacture operating system from a PXE server, stores the manufacture operating system in the virtual drive and executes the manufacture operating system. The manufacture operating system obtains manufacturing information from the network location and creates a virtual manufacture disk in the virtual drive that configures the information handling system in the place of a floppy disk. The manufacture data storage and retrieval system stores the state of manufacture before re-boots that erase the RAM in order to persist manufacture state information through the manufacture process.

The present invention provides a number of important technical advantages. One example of an important technical advantage is that the universal PXE client supports building, testing and downloading software during manufacture of an information handling system without the use of a floppy disk. A virtual disk is instead created in volatile memory of the information handling system by the universal PXE client which applies configuration information compiled during assembly of the information handling system and stored at a network location. The use of network storage instead of floppy disks reduces the time and expense of obtaining initial power-up of the information handling system and improves reliability of software configuration and testing.

Another example of an important technical advantage of the present invention is that network-based manufacture storage tracks manufacturing states for configuration of software on an information handling system without use of a removable medium. Manufacture progress is tracked on the virtual drive in volatile memory of the information handling system similar to the process used for floppy removable disks. However, at re-boot of the information handling system the manufacture information is destroyed. Thus, before each re-boot and periodically through manufacture, the manufacture information is stored at a network location. By referencing the network location after completion of re-boot, the information handling system progresses with the next manufacture state. This allows the use of multiple different operating systems compared with the single operating system generally available on the limited storage of a floppy disk and also permits imaging to permanent storage, such as the hard disk drive, without loss of manufacture information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A network-based information handling system manufacture software configuration is performed with a universal PXE client that creates a virtual manufacture disk in memory of the information handling system and loads a manufacture operating system to configure the software of the information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system must include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
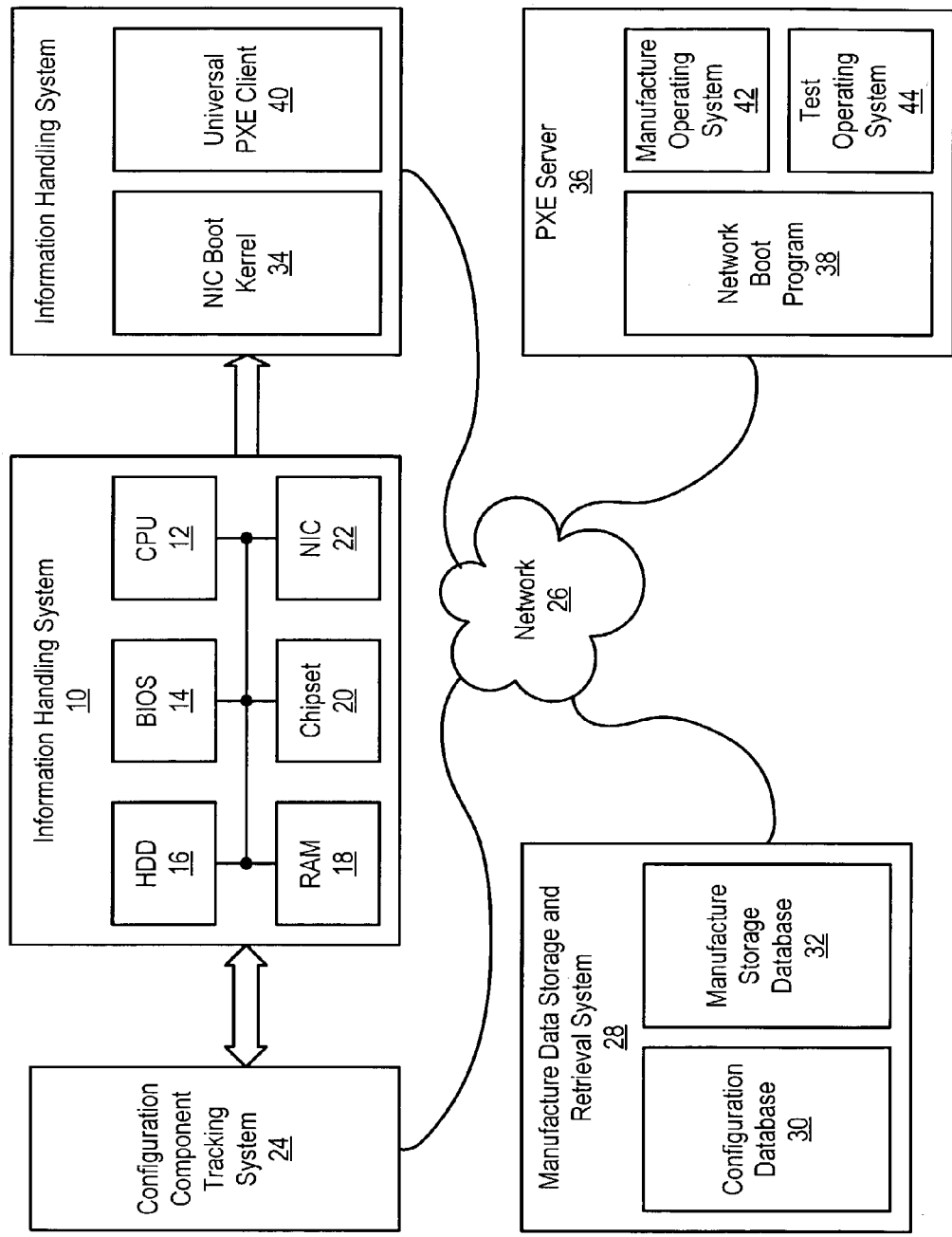
FIG. 1 depicts a block diagram of a system for network-based configuration of information handling system software during manufacture.

Referring now to FIG. 1, a block diagram depicts a system for network-based configuration of information handling system software during manufacture. An information handling system 10 is assembled from a number of hardware components, such as a CPU 12, BIOS 14, hard disk drive 16, RAM 18, chipset 20 and network interface card (NIC) 22. As the hardware components are assembled, their identification codes, such as part numbers or serial codes, are provided to a configuration component tracking system 24. Once assembly of hardware components for information handling system 10 is complete, configuration component tracking system 24 creates a process control file with instructions for a pre-operating system boot environment for the assembled hardware component configuration. For instance, the control file includes configuration information similar to that used on disks for information handling system manufacture. Configuration component tracking system 24 also identifies manufacturing information for use in software configuration of the information handling system post-operating system boot environment, such as the operating system, device drivers, manufacturing information and test diagnostics. The results from configuration component tracking system 24 are associated with a unique number of information handling system 10 and sent through a network 26 for storage on a manufacture data storage and retrieval system 28 in a configuration database 30.

When power is applied to information handling system 10, a boot kernel 34 stored in firmware of NIC 22 is activated to communicate through network 26 with a PXE server 36 to download a network boot program 38. Boot kernel 34 saves network boot program 38 in local memory and executes it. Network boot program 38 is a PXE OS having a scripting engine that executes scripts to create a universal PXE client 40 that customizes the manufacture boot process for the information handling system. Universal PXE client 40 first discovers a unique identifier for the information handling system, such as a serial number or service tag saved in non-volatile memory, such as CMOS, or input by an operator. Universal PXE client 40 uses the unique identifier to contact manufacture data storage and retrieval system 28 for obtaining the configuration information associated with the unique identifier in configuration database 30, such as virtual drive size, operating system, image name, NIC type, the type of file system to install, the location to install the manufacturing operating system, or other specified unique information for the creation of the virtual drive. Universal PXE client 40 applies the configuration settings to determine a manufacture operating system image name, a drive size for creation of a drive within RAM 18 to act as a virtual disk, an operating system type and hardware component drivers. Universal PXE client 40 creates the virtual manufacture disk drive in RAM 18, downloads the identified manufacture operating system 42 from PXE server 36 and prepares the virtual manufacture drive to operate. Universal PXE client 40 then initiates the manufacture operating system and removes itself from information handling system 10. Creation of a RAM drive instead of a floppy or hard disk as the initial boot media and manufacture information storage device supports building unique information handling systems, including systems that lack a hard or floppy drive.

The manufacturing operating system 42 installed on information handling system 10 by universal PXE client 40 is operates similar to manufacturing systems that operate from floppy disks. For instance, a DOS or Linux image having drivers for connecting to network 26 contacts manufacture data storage and retrieval system 28 to download manufacture applications associated with the unique identifier of the information handling system from configuration database 30. The manufacture applications are loaded in the virtual RAM drive created by universal PXE client 40 and the state of the manufacture for the information handling system is stored in manufacture storage database 32. Information handling system 10 then starts the manufacture process to configure the software. Instead of saving dynamic manufacturing information to a floppy disk drive as the manufacturing process is performed, the virtual drive in RAM is used, such as for storing test logs, the manufacture state, process control flags and related information. Before each re-boot and periodically through the manufacture process, the contents of the virtual manufacture drive are copied from RAM to manufacture storage database 32 in order to persist the data and make the latest manufacturing information readily available. The manufacturing application is thus able to switch from manufacturing operating system 42 to a test operating system 44 once the software configuration is complete without requiring the use of removable media. Further, during manufacture different operating systems may be run at different points of manufacture by booting with operating system specific universal PXE clients to switch to a different operating system as needed.

Figure 2:
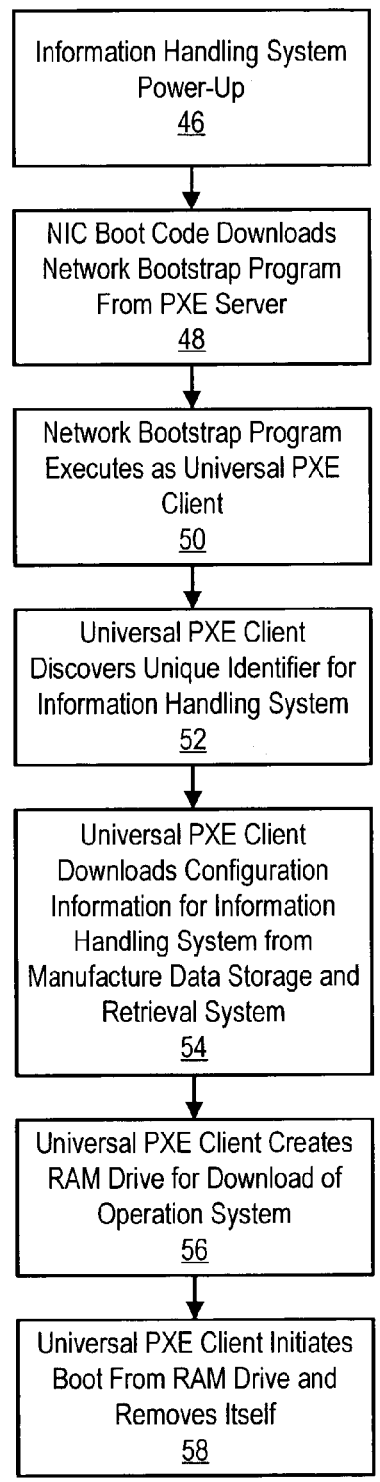
FIG. 2 depicts a flow diagram of a process for network-based configuration of information handling system software during manufacture.

Referring now to FIG. 2, a flow diagram depicts a process for network-based configuration of information handling system software during manufacture. The process begins at step 46 with power-up of the information handling system. At step 48, device boot settings in the system CMOS activates the boot kernel stored in firmware to download the network bootstrap program from the PXE server. At step 50, the boot kernel executes the network bootstrap program to create the universal PXE client. At step 52, the universal PXE client discovers the unique identifier for the information handling system and, at step 54, the universal PXE client downloads configuration information from a network location to volatile memory, such as RAM, of the information handling system. At step 56, the universal PXE client creates the virtual drive in volatile memory, such as RAM, and downloads the manufacture operating system from the PXE server. At step 58, the universal PXE client initiates boot from the virtual RAM drive and removes itself from memory. The manufacture operating system is then able to download any additional manufacturing information and proceed with configuration of the software of the information handling system by using the virtual RAM drive as a manufacturing disk in the place of a floppy disk.

Although the present invention has been described in detail, it should be understood that various changes, substitutions and alterations can be made hereto without departing from the spirit and scope of the invention as defined by the appended claims.

What is claimed is:

1. A system for managing software configuration at manufacture of information handling systems, the system comprising:
    a manufacture server operable to interface with the information handling system through a network and having
    a configuration database that associates configuration information for each information handling system with an identifier for that information handling system;
    a PXE server operable to interface with the information handling system through a network and having a manufacture operating system;
    a network boot program stored on the PXE server and operable to execute as a PXE client on the information handling system; and
    a boot kernel stored on the information handling system and operable to download the network boot program and to initiate execution of the PXE client;
    wherein the PXE client is operable to determine a unique identifier of an information handling system, obtain the configuration information associated with the unique identifier in the configuration database, establish a drive on random access memory of the information handling system with the configuration information and install the manufacture operating system in the drive;
    wherein the manufacture server further has a manufacture storage database operable to store the manufacture state of the information handling system.

2. The system of claim 1 wherein the configuration information comprises the size of the random access memory.

3. The system of claim 1 wherein the configuration information comprises an operating system image name.

4. The system of claim 1 wherein the manufacture operating system comprises DOS.

5. The system of claim 1 wherein the manufacture operating system comprises Linux.

6. The system of claim 1 wherein the boot kernel comprises NIC firmware.

7. A method for performing software configuration at manufacture of an information handling system, the method comprising:
    executing firmware instructions upon application of power to the information handling system to download a network boot program;
    executing the network boot program to generate a PXE client on the information handling system;
    discovering a unique identifier saved on the information handling system with the PXE client;
    downloading a configuration information associated with the discovered unique identifier;
    applying the configuration information with the PXE client to create a virtual drive on random access memory of the information handling system;
    loading a manufacture operating system in the drive with the PXE client;
    executing the manufacture operating system;
    building a manufacture application with the manufacture operating system;
    copying the manufacture application state to a network location;
    re-booting the information handling system; and
    accessing the manufacture application state from the network location to continue with software configuration.

8. The method of claim 7 wherein the network boot program comprises a scripting engine.

9. The method of claim 7 wherein applying the configuration image further comprises:
    determining a drive size for running the manufacture operating system; and
    creating the virtual drive in random access memory having the determined drive size.

10. The method of claim 9 wherein the manufacture operating system comprises DOS.

11. The method of claim 7 further comprising:
removing the PXE client from the information handling system.

12. The method of claim 7 wherein the firmware instructions executed on application of power to the information handling system comprise NIC firmware instructions.

13. A method for configuring information handling system software through a network, the method comprising:
discovering a unique identifier saved on the information handling system;
retrieving from a network location configuration information associated with the unique identifier;
creating a drive in volatile memory according to the configuration information;
retrieving from a network location a manufacture operating system;
installing the manufacture operating system in the created drive;
running the manufacture operating system to perform a manufacture applications;
tracking manufacture states of the information handling system at a network location; and
re-establishing the manufacture state in random access memory after a re-boot of the information handling system.

14. The method of claim 13 wherein the volatile memory comprises random access memory.

15. The method of claim 13 wherein retrieving and installing the manufacture operating system further comprises running a PXE client that interacts with a PXE server, the PXE server storing the manufacture operating system.

16. The method of claim 15 further comprising:
removing the PXE client; and
initiating the manufacture operating system.

* * * * *